US009689680B2

(12) United States Patent
Jamain et al.

(10) Patent No.: US 9,689,680 B2
(45) Date of Patent: Jun. 27, 2017

(54) METHOD AND APPARATUS FOR APPROACHES TO PROVIDE FOR COMBINING CONTEXTS RELATED TO ITEMS OF INTEREST AND NAVIGATION

(71) Applicant: Nokia Corporation, Espoo (FI)

(72) Inventors: Maguy Jamain, Berlin, DE (US); Jerome Beaurepaire, Berlin (DE)

(73) Assignee: HERE GLOBAL B.V., Veldhoven (NL)

(*) Notice: Subject to any disclaimer, the term of this patent is extended or adjusted under 35 U.S.C. 154(b) by 0 days.

(21) Appl. No.: 13/909,685

(22) Filed: Jun. 4, 2013

(65) Prior Publication Data
US 2014/0358439 A1    Dec. 4, 2014

(51) Int. Cl.
| G01C 21/00 | (2006.01) |
| G06F 3/048 | (2013.01) |
| G01C 21/34 | (2006.01) |
| G01C 21/26 | (2006.01) |
| G06Q 20/32 | (2012.01) |
| G01C 21/36 | (2006.01) |

(52) U.S. Cl.
CPC ............ *G01C 21/00* (2013.01); *G01C 21/26* (2013.01); *G01C 21/34* (2013.01); *G01C 21/3617* (2013.01); *G06F 3/048* (2013.01); *G06Q 20/3224* (2013.01)

(58) Field of Classification Search
CPC ........ G01C 21/26; G01C 21/34; G07C 5/008; G06F 3/048
USPC ........ 701/123, 414, 516, 533; 715/744, 771, 715/835
See application file for complete search history.

(56) References Cited

U.S. PATENT DOCUMENTS

| 6,360,167 B1* | 3/2002 | Millington | G07C 5/008 342/357.31 |
| 6,691,128 B2* | 2/2004 | Natesan | G01C 21/32 701/430 |
| 2003/0220835 A1 | 11/2003 | Barnes, Jr. | |
| 2005/0032528 A1* | 2/2005 | Dowling | H04L 12/1859 455/456.1 |
| 2005/0107951 A1* | 5/2005 | Brulle-Drews | G01C 21/3461 701/533 |
| 2005/0278371 A1* | 12/2005 | Funk | G06F 17/30241 |
| 2006/0173841 A1* | 8/2006 | Bill | G01C 21/3407 |
| 2006/0276201 A1* | 12/2006 | Dupray | G01S 5/0257 455/456.1 |

(Continued)

OTHER PUBLICATIONS

Extended European Search Report for corresponding European Application No. 14169372.1, dated Dec. 1, 2014, 6 pages.

(Continued)

*Primary Examiner* — Thomas G Black
*Assistant Examiner* — Wae Louie
(74) *Attorney, Agent, or Firm* — Ditthavong & Steiner, P.C.

(57) ABSTRACT

An approach is provided for determining a request by a user to initiate route calculation to at least one destination. The approach involves determining one or more items of interest associated with the user. The approach also involves determining availability information of the one or more items of interest at the at least one destination. The approach further involves causing, at least in part, a presentation of at least one message regarding the availability information.

20 Claims, 14 Drawing Sheets

(56) References Cited

U.S. PATENT DOCUMENTS

| | | | | |
|---|---|---|---|---|
| 2008/0104531 A1* | 5/2008 | Stambaugh | G01C 21/30 | 715/771 |
| 2008/0104532 A1* | 5/2008 | Stambaugh | G01C 21/30 | 715/771 |
| 2008/0109756 A1* | 5/2008 | Stambaugh | G06F 17/3087 | 715/835 |
| 2008/0109757 A1* | 5/2008 | Stambaugh | G06F 3/0481 | 715/835 |
| 2008/0109758 A1* | 5/2008 | Stambaugh | G06F 3/0481 | 715/835 |
| 2008/0109759 A1* | 5/2008 | Stambaugh | G06F 17/3087 | 715/835 |
| 2008/0109760 A1* | 5/2008 | Stambaugh | G01C 21/30 | 715/835 |
| 2008/0109761 A1* | 5/2008 | Stambaugh | G06F 3/0482 | 715/853 |
| 2008/0111818 A1* | 5/2008 | Stambaugh | G01C 21/30 | 345/440 |
| 2008/0133120 A1* | 6/2008 | Romanick | G01C 21/3469 | 701/123 |
| 2008/0133124 A1* | 6/2008 | Sarkeshik | G01C 21/3611 | 701/533 |
| 2008/0140309 A1* | 6/2008 | Jendbro | G01C 21/3614 | 701/533 |
| 2009/0157312 A1* | 6/2009 | Black | G01C 21/30 | 701/414 |
| 2009/0228467 A1 | 9/2009 | Asanuma | | |
| 2009/0240586 A1* | 9/2009 | Ramer | G06F 17/30905 | 705/14.64 |
| 2010/0250384 A1 | 9/2010 | Bhargava | | |
| 2010/0332339 A1 | 12/2010 | Patel et al. | | |
| 2013/0046753 A1* | 2/2013 | Bowers | G06F 17/3087 | 707/722 |
| 2013/0103300 A1 | 4/2013 | Rakthanmanon et al. | | |
| 2013/0311898 A1* | 11/2013 | Beaurepaire | G01C 21/3438 | 715/744 |
| 2014/0129976 A1* | 5/2014 | Beaurepaire | G01C 21/367 | 715/788 |
| 2014/0164322 A1* | 6/2014 | Beaurepaire | G06F 17/30575 | 707/610 |
| 2014/0188387 A1* | 7/2014 | Beaurepaire | G06F 3/03 | 701/533 |
| 2014/0358439 A1* | 12/2014 | Jamain | G01C 21/00 | 701/538 |

OTHER PUBLICATIONS

Steiniger et al., "Foundations of Location Based Services", Lecture Notes on LBS, vol. 1.0, Jan. 2006, pp. 1-28.

Communication pursuant to Article 94(3) EPC for corresponding European Patent Application No. 14 169 372.1-1958 dated Aug. 26, 2015, 4 Pages.

* cited by examiner

FIG. 10 A

| USER'S MUST HAVE LIST | DESTINATION | PRODUCTS AVAILABLE | DISTANCE | ETA | RATIO |
|---|---|---|---|---|---|
| 1. MILK<br>2. PEANUT BUTTER<br>3. COUGH MEDICINE<br>4. BREAD<br>5. BANANAS<br>6. FISH<br>7. PENS<br>8. TOOTHBRUSH<br>9. TOOTHPASTE<br>10. BAG | SHOP A | 9 PRODUCTS | 7 KM | 17 MIN | 9/10 |
| | SHOP B | 7 PRODUCTS | 8 KM | 19 MIN | 7/10 |
| | SHOP C | 6 PRODUCTS | 9 KM | 21 MIN | 6/10 |

METHOD AND APPARATUS FOR APPROACHES TO PROVIDE FOR COMBINING CONTEXTS RELATED TO ITEMS OF INTEREST AND NAVIGATION

BACKGROUND

Service providers and device manufacturers (e.g., wireless, cellular, etc.) are continually challenged to deliver value and convenience to consumers by, for example, providing compelling network services. The amount of user-created content accessible by devices through the network services is increasing. However, no services currently exist that allows users to query for items of interest based on the characteristics associated with the items during initiation of route calculation to at least one destination. For example, many users find it is difficult to interact with various services to locate an item of interest, and receive accurate information with respect to their availability at the at least one destination. Accordingly, service providers and device manufacturers are challenged to develop accurate and easy to use mechanisms for users to receive information on the availability of the items of interest.

SOME EXAMPLE EMBODIMENTS

Therefore, there is a need for an approach for determining availability information of one or more items of interest associated with the user at the at least one destination during initiation of route calculation.

According to one embodiment, a method comprises determining a request by a user to initiate route calculation to at least one destination. The method also comprises determining one or more items of interest associated with the user. The method further comprises determining availability information of the one or more items of interest at the at least one destination. The method also comprises causing, at least in part, a presentation of at least one message regarding the availability information.

According to another embodiment, an apparatus comprises at least one processor, and at least one memory including computer program code for one or more computer programs, the at least one memory and the computer program code configured to, with the at least one processor, cause, at least in part, the apparatus to determine a request by a user to initiate route calculation to at least one destination. The apparatus is also caused to determine one or more items of interest associated with the user. The apparatus is further caused to determine availability information of the one or more items of interest at the at least one destination. The apparatus also causes, at least in part, a presentation of at least one message regarding the availability information.

According to another embodiment, a computer-readable storage medium carries one or more sequences of one or more instructions which, when executed by one or more processors, cause, at least in part, an apparatus to determine a request by a user to initiate route calculation to at least one destination. The apparatus is also caused to determine one or more items of interest associated with the user. The apparatus is further caused to determine availability information of the one or more items of interest at the at least one destination. The apparatus also causes, at least in part, a presentation of at least one message regarding the availability information.

According to another embodiment, an apparatus comprises means for determining a request by a user to initiate route calculation to at least one destination. The apparatus also comprises means for determining one or more items of interest associated with the user. The apparatus further comprises means for determining availability information of the one or more items of interest at the at least one destination. The apparatus also comprises means for causing, at least in part, a presentation of at least one message regarding the availability information.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for determining availability information of one or more items of interest associated with the user at the at least one destination during initiation of route calculation are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
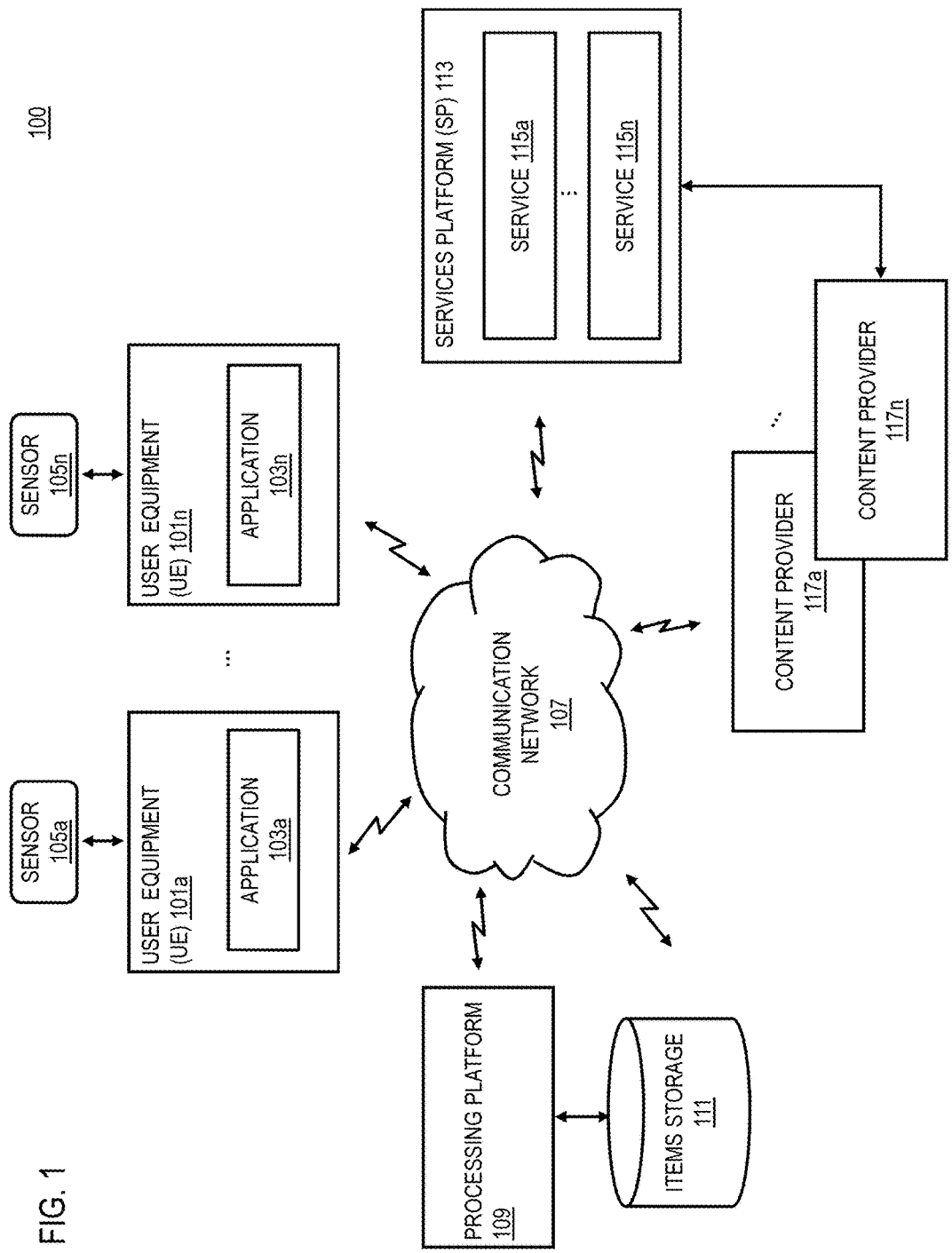
FIG. 1 is a diagram of a system capable of determining availability information of one or more items of interest associated with the user at the at least one destination during initiation of route calculation, according to one embodiment.

FIG. 1 is a diagram of a system capable of determining availability information of one or more items of interest associated with the user at the at least one destination during initiation of route calculation, according to one embodiment. As mentioned, users need an efficient method of receiving status updates on the items of their interest, cautioning them about the availability of an item before initiating navigation to a specified location. In one scenario, a user may visit a shop to buy a specific product and realize once in the shop that the product is not available. A user may avoid such painful experience by calling the shop and asking for the availability of a specific product, however this method is cumbersome. Further, users willing to provide/share items and user information find it burdensome (e.g., unfamiliar with various services and online technologies) to search for items and submit relevant item information.

To address this problem, a system 100 of FIG. 1 introduces a solution in a navigation system that allows users to automatically check availability for items of interest before starting navigation. In one embodiment, system 100 may assign items of interest for specific users to one or more destinations, such assignment may be done manually by the users and/or by processing contextual information of the users, such as, recurrent purchases made by the users using their respective mobile devices etc. In one embodiment, the system may identify the items which the users may require and provides an update on their availability at specific point of interest. Further, the system cautions the users in case of non-availability of such items at specific point of interest and may recommend alternative destinations based, at least in part, on availability of the items, distance etc. In this manner, system 100 enables easy query of items of interest.

As shown in FIG. 1, the system 100 comprises user equipment (UE) 101a-101n (collectively referred to as UE 101) that may include or be associated with applications 103a-103n (collectively referred to as applications 103) and sensors 105a-105n (collectively referred to as sensors 105). In one embodiment, the UE 101 have connectivity to a processing platform 109 via the communication network 107. In one embodiment, the processing platform 109 performs one or more functions associated with determining availability information of one or more items of interest associated with the user at the at least one destination during initiation of route calculation.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the applications 103 may be any type of application that is executable at the UE 101, such as media player applications, social networking applications, calendar applications, content provisioning services, location-based service applications, navigation applications and the like. In one embodiment, one of the applications 103 at the UE 101 may act as a client for processing platform 109 and perform one or more functions associated with the functions of the processing platform 109 by interacting with the processing platform 109 over communication network 107.

By way of example, the sensors 105 may be any type of sensor. In certain embodiments, the sensors 105 may include, for example, a camera/imaging sensor for gathering image data, an audio recorder for gathering audio data, a global positioning sensor for gathering location data, a network detection sensor for detecting wireless signals or network data, temporal information and the like. In one scenario, the sensors 105 may include location sensors (e.g., GPS), light sensors, oriental sensors augmented with height sensor and acceleration sensor, tilt sensors, moisture sensors, pressure sensors, audio sensors (e.g., microphone), or receivers for different short-range communications (e.g., Bluetooth, WiFi, near field communication etc.).

The communication network 107 of system 100 includes one or more networks such as a data network, a wireless network, a telephony network, or any combination thereof.

It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the processing platform 109 may be a platform with multiple interconnected components. The processing platform 109 may include multiple servers, intelligent networking devices, computing devices, components and corresponding software for determining availability information of one or more items of interest associated with the user at the at least one destination during initiation of route calculation. In addition, it is noted that the processing platform 109 may be a separate entity of the system 100, a part of the one or more services 115a-115n (collectively referred to as services 115) of the services platform 113, or included within the UE 101 (e.g., as part of the application 103).

In one embodiment, the processing platform 109 may determine a request from a user to access availability information for one or more items of interest before initiating route calculation for at least one point of interest. In one scenario, user may grant permission to the processing platform 109 for accessing/retrieving the one or more information items, which may be available via a user device, via a storage repository, via a content provider, and the like. Furthermore, once the processing platform 109 verifies that the items and the one or more information are associated, the service provider may present various prompts to the users, ensuring the users are updated on the availability of the associated items at one or more destinations.

In one embodiment, the processing platform 109 determines that a user is associated with at least one item. In one embodiment, the processing platform 109 receives an indication from a user indicating that the user is associated with at least one item. In one embodiment, the processing platform 109 has access to contextual information of a user, for instance, subsequent visits/searches by the user for one or more products and the like. In one scenario, the processing platform 109 may process and associate one or more comments, ratings, rankings, quality information, user experience, and the like, from a user to determine the likelihood of user purchasing the item in future.

In one embodiment, the processing platform 109 may query one or more storage repositories associated with one or more point of interest for the availability of the one or more items upon receiving user requests. In one scenario, the processing platform 109 may utilize various search term to conduct one or more searches for the one or more items at one or more storage repositories (e.g., items storage 111), one or more content providers, one or more other service providers, and the like. In one scenario, the processing platform 109 may query at least one user in relation to the items that still remain at the user's home.

In one embodiment, the items storage 111 may store information on items of interest for specific users from the sensors 105, processing platform 109, services platform 113 and/or one or more content providers 117a-117n (collectively referred to as content provider 117), for the user to access at a later date. In one embodiment, the items storage 111 may store information on items associated with the at least one point of interest. In one scenario, the items storage 111 may store information on items that still remain unfinished at users home. In one embodiment, the processing platform 109 may include and/or have access to the items storage 111 to access and/or store information associated with the items of interest.

The services platform 113 may include any type of service. By way of example, the services platform 113 may include mapping services, navigation services, travel planning services, social networking services, content (e.g., audio, video, images, etc.) provisioning services, application services, storage services, contextual information determination services, location based services, information (e.g., weather, news, etc.) based services, etc. In one embodiment, the services platform 113 may interact with the UE 101, the processing platform 109 and the content provider 117 to supplement or aid in the processing of the content information.

By way of example, services 115 may be an online service that reflects interests and/or activities of users. In one scenario, the services 115 provide representations of each user (e.g., a profile), his/her social links, and a variety of additional information. The services 115 allow users to share location information, activities information, contextual information, historical user information and interests within their individual networks, and provides for data portability. The services 115 may additionally assist in providing the processing platform 109 with travel information of the one or more geo-routes and/or location anchors, etc.

The content provider 117 may provide content to the UE 101, the processing platform 109, and the services 115 of the services platform 113. The content provided may be any type of content, such as textual content, audio content, video content, image content, etc. In one embodiment, the content provider 117 may provide content that may supplement content of the applications 103, the sensors 105, or a combination thereof. By way of example, the content provider 117 may provide content that may aid in the processing of the items of interest associated with a user at the at least one point of interest to determine a route for navigation purposes. In one embodiment, the content provider 117 may also store content associated with the UE 101, the processing platform 109, and the services 115 of the services platform 113. In another embodiment, the content provider 117 may manage access to a central repository of data, and offer a consistent, standard interface to data, such as a repository of users' navigational data content.

By way of example, the UE 101, the processing platform 109, the services platform 113, and the content provider 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
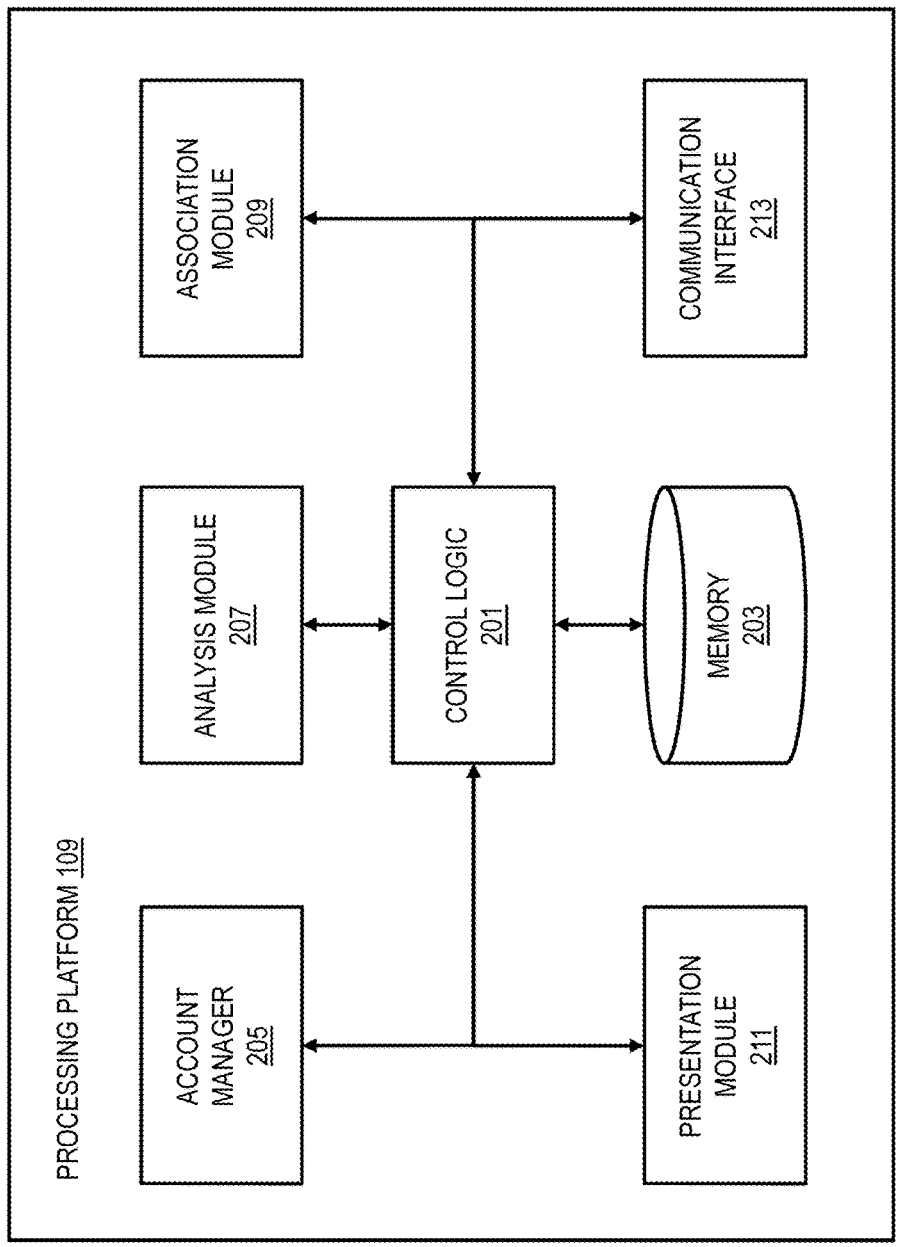
FIG. 2 is a diagram of the components of processing platform 109, according to one embodiment.

FIG. 2 is a diagram of the components of a processing platform 109, according to one embodiment. By way of example, the processing platform 109 includes one or more components for analyzing and processing availability information for items of interest associated with a user. It is contemplated that the functions of these components may be combined in one or more components or performed by other components of equivalent functionality. In this embodiment, the processing platform 109 includes control logic (or processor) 201, memory 203, an account manager 205, an analysis module 207, an association module 209, a presentation module 211, and a communication interface 213.

The control logic 201 executes at least one algorithm, software, application, and the like for executing functions of the processing platform 109. For example, the control logic 201 may interact with the account manager 205 to register a user, and access one or more information on item of interest associated with the user. The information may include recurrent purchases by the users, user ratings, user comments and the like. In determining registration request for a user, the account manager 205 may process information associated with the user, such as the user's account information, user status, privacy policy, security policy, etc. If, for instance, it is determined that the user satisfies the requirements of the service provider, the account manager 205 may then register and prompt the user to associate at least one item of interest with one or more point of interest.

As such, the account manager 205 may work with the analysis module 207, via the control logic 201, to process information on items of interest associated with a user to generate a user profile and/or add new items information to an account already associated with the user. In one embodiment, the information associated with one or more items may be retrieved from a local or remote database (e.g., storage repositories of certain point of interest, a search database, a social networking database, etc.), a content provider, a user device, another service provider, and the like. In one embodiment, the analysis module 207 may receive one or more queries for items associated with a user. The analysis module 207 causes a querying of the items storage 111 for the one or more items of interest based on a selection of a user. By way of example, a user makes a selection of one or more items by selecting title and/or characteristics represented by an item (e.g., sounds, trademark, color, pictures, slogans, etc.).

Next, the control logic 201 may then direct the association module 209 to associate together the one or more information for one or more items of interest with at least one point of interest.

Consequently, the presentation module 211 may present the information to the users. Further, the processing platform 109 may share such information with one or more service providers, content providers, and the like based, at least in part, on the privacy and/or security policies.

The control logic 201 may also utilize the communication interface 213 to communicate with other components of the processing platform 109, the UEs 101, the services platform 113, the content provider 117, and other components of the system 100. For example, the communication interface 213 may transmit a notification to a user's device to indicate whether the user request has been registered with one or more service providers. The communication interface 213 may further include multiple means of communication. In one use case, the communication interface 213 may be able to communicate over near field communication, SMS, internet protocol, instant messaging, voice sessions (e.g., via a phone network), or other types of communication.

Figure 3:
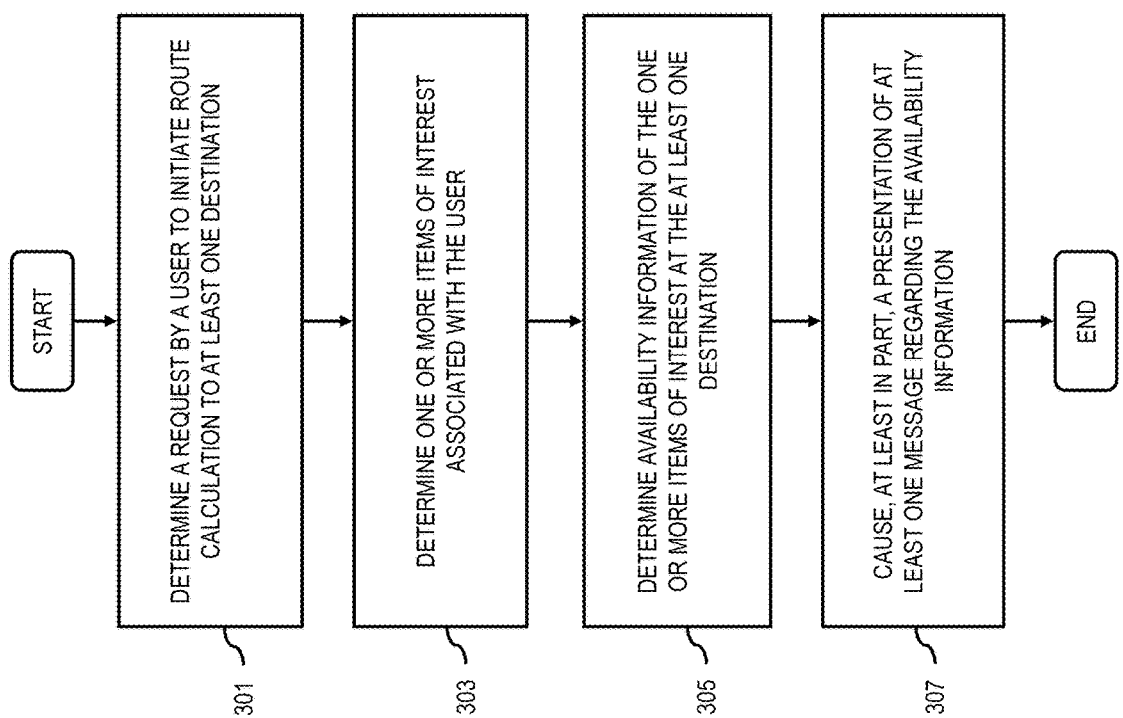
FIGS. 3-5 are flowcharts of a process for determining availability information of one or more items of interest associated with the user at the at least one destination during initiation of route calculation, according to various embodiments.
Figure 12:
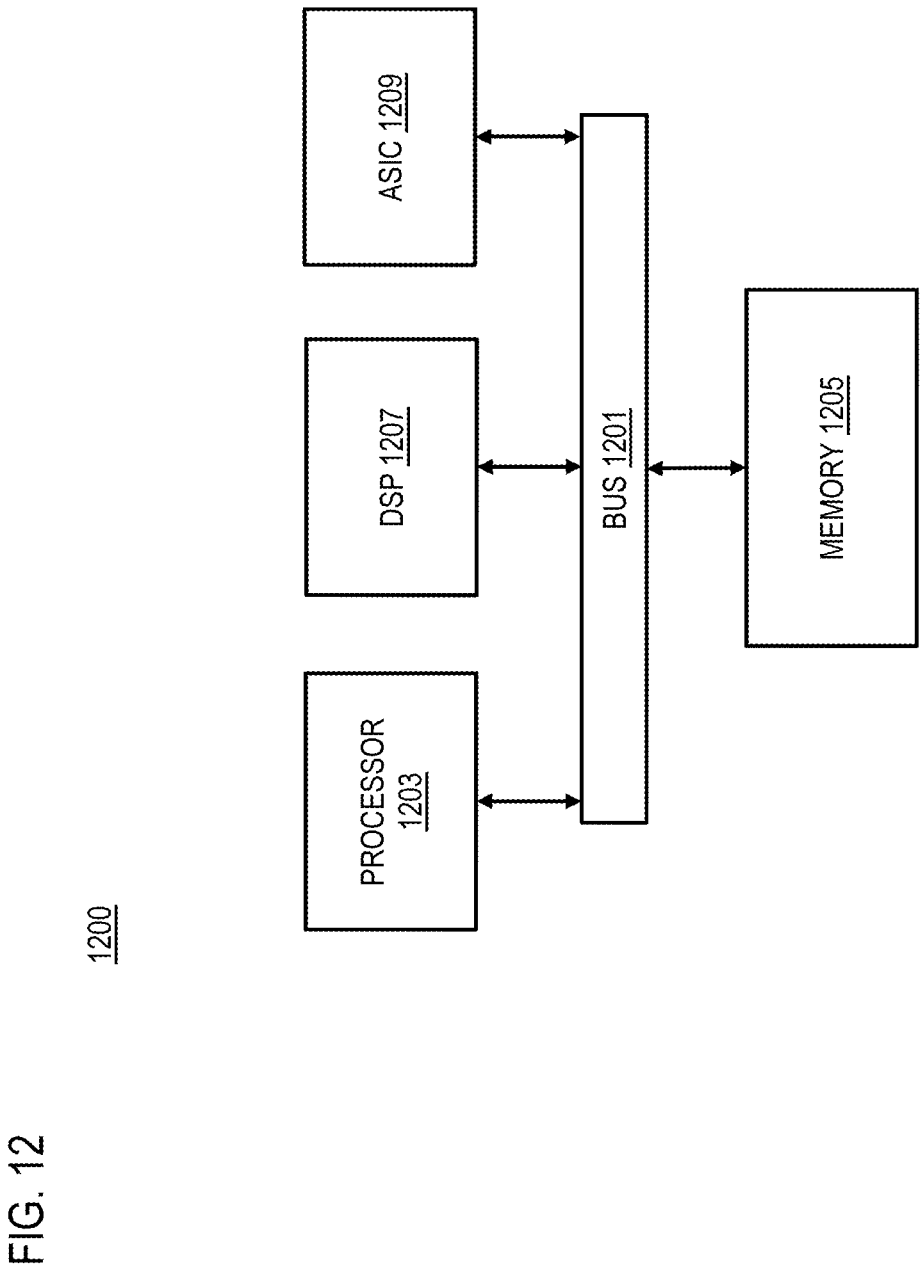
FIG. 12 is a diagram of a chip set that can be used to implement an embodiment of the invention.

FIG. 3 is a flowchart of a process for determining availability information of one or more items of interest associated with the user at the at least one destination during initiation of route calculation, according to one embodiment. In one embodiment, the processing platform 109 performs the process 300 and is implemented in, for instance, a chip set including a processor and a memory as shown in FIG. 12.

In step 301, the processing platform 109 determines a request by a user to initiate route calculation to at least one destination. In one scenario, a user may need to visit XYZ store to purchase certain items of interest, and may use his UE 101 for navigational purpose. The processing platform 109 may determine during a request for route calculation, a request from UE 101 to access data for availability of one or more items of interest before initiating navigation to at least one point of interest. In one scenario, the processing platform 109 may determine the users selection of the one or more items of interest as a 'destination', whereby the items are treated as navigation objects, and based on the possible existing associations, and the determined availability information, the processing platform 109 may create appropriate route recommendations, or suggest POI destinations for the user to choose from. In one scenario, the processing platform 109 may support any suitable combination of user-selectable items and destinations. For instance, a user may select a favorite mall that he/she may be going regardless of any item availability, additionally or instead, the user may select his/her must have item(s) that needs to be purchased. Subsequently, the processing platform 109 may create a recommended route, giving weightage to certain aspects, for instance, distance, time, cost, personal travel preferences and so on. A simple use case example can be, a user selecting one 'real' destination, and one 'item' as a destination, in the navigation application, whereby the processing platform 109 may perform necessary determinations to get one or more 'real' destinations that are associated with the items, and provide for routing recommendations accordingly.

In step 303, the processing platform 109 determines one or more items of interest associated with the user. In one scenario, the processing platform 109 identifies items of interest for a particular user, such identification may be based, at least in part, on the association of the one or more items with the one or more destinations which is further based, at least in part, one or more contextual parameters, one or more location parameters, one or more temporal parameters, or a combination thereof. In one scenario, the processing platform 109 may process one or more information provided by the user to cause, at least in part, a generation of one or more reports with respect to association of one or more products with the at least one point of interest. In one scenario, the processing platform 109 may take into consideration previous transactions made by the users using UE 101.

In step 305, the processing platform 109 determines availability information of the one or more items of interest at the at least one destination. The processing platform 109 may query one or more storage repositories associated with the at least one point of interest for the availability of the one or more items of interest based, at least in part, on the one or more requests from the UE 101 of one or more users. In one scenario, the processing platform 109 causes, at least in part, a comparison between the information provided by the user against the information stored in one or more storage repositories associated with the at least one point of interest. In one scenario, the processing platform 109 displays information on the availability of the one or more products based, at least in part, on the comparison.

In step 307, the processing platform 109 causes, at least in part, a presentation of at least one message regarding the availability information. In one scenario, the processing platform 109 displays routes based, at least in part, on the availability of the items of interest to a user. In one scenario, the processing platform 109 may cause, at least in part, a presentation of an alert message based, at least in part, on non-availability of one or more products at a specific point of interest. In one scenario, if one or more items from a user's shopping list are not available, the processing platform 109 may refer to UE 101, services platform 113, content provider 117, and items storage 111 to determine whether the one or more unavailable items are available at user's home to better understand the consequences of not being able to purchase the items.

Figure 4:
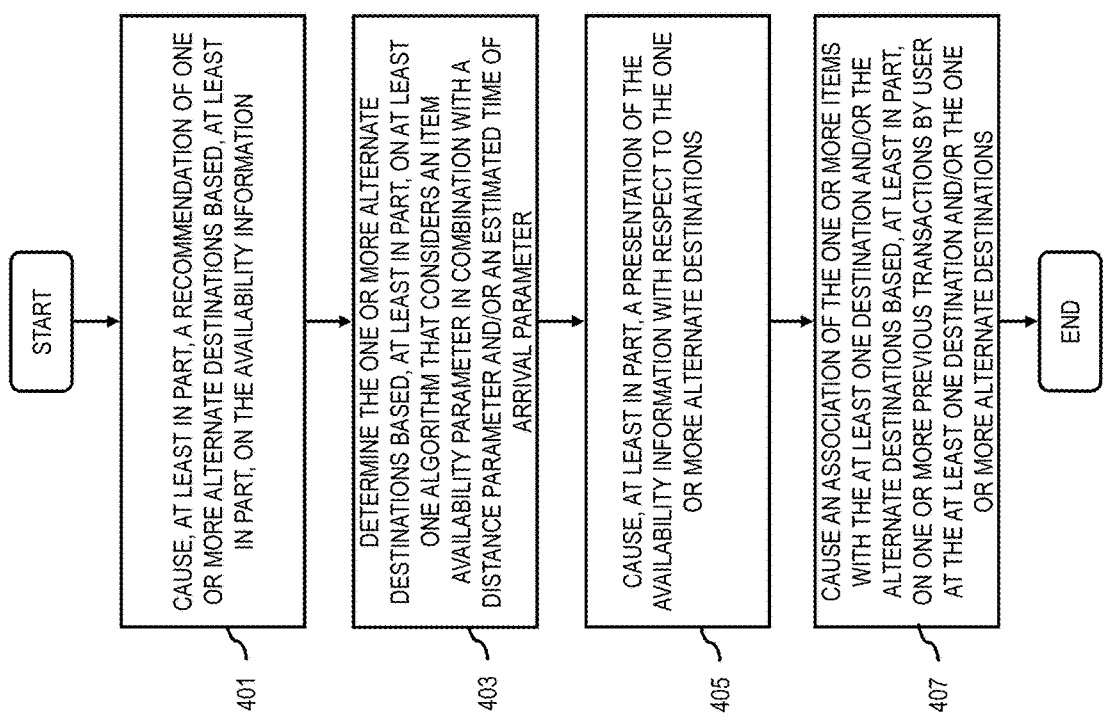

FIG. 4 is a flowchart of a process for determining availability information for items of interest in alternative destinations, according to one embodiment. In one embodiment, the processing platform 109 performs the process 400 and is implemented in, for instance, a chip set including a processor and a memory as shown in FIG. 12.

In step 401, the processing platform 109 causes, at least in part, a recommendation of one or more alternate destinations based, at least in part, on the availability information. In one scenario, the processing platform 109 may process the one or more information associated with the items of interest and generate a report with respect to availability of the items at the one or more POIs. In one scenario, the processing platform 109 may cause a display of a list of substitute POIs for user to choose from, upon determining that the items of user's interest are not available at a specific POI.

In step 403, the processing platform 109 determines one or more alternate destinations based, at least in part, on at least one algorithm that considers an item availability parameter in combination with a distance parameter, an estimated time of arrival parameter, or a combination thereof, wherein the presentation of the availability information is via a route selection user interface of a navigation application, a mapping application, or a combination thereof. In one scenario, a user may want to visit XYZ shop to buy some products. The user may use his UE 101 for getting directions to the XYZ shop from his location. Then, the processing platform 109 upon receiving such request automatically identifies the products associated with the user and queries with the storage repositories associated with XYZ shop for availability of the products, upon determining that several of the products are not available at XYZ shop, the processing platform may determine alternate destinations based, at least in parts, on the availability of the number of items the user needs, the time and distance of travel from user location etc.

In step 405, the processing platform 109 causes, at least in part, a presentation of the availability information with respect to the one or more alternate destinations. In one scenario, the processing platform 109 may display at least one prompt to the user with respect to availability of the items of interest. Such prompt may include one or more questions to the users, and the presentation of the alternate POIs may be based, at least in part, on one or more responses from the user to the one or more questions. In one scenario, a user may be prompted that the items are not available at the POI user is heading to, and may ask the user if he still wants to navigate to the POI, and based on the response from the user, the processing platform 109 may display the alternate destinations. In one scenario, if one or more items from a user's shopping list are not available, the processing platform 109 may determine whether the one or more unavailable items are available at user's home, whereby the processing platform may display at least one prompt to the user, for instance, 'one or more items are not available at your destination today, but it seems you still have the items available at your home, do you still want to navigate to this destination?". Such prompt may help a user in making better judgments in relation to travelling to a particular destination.

In step 407, the processing platform 109 causes, at least in part, an association of the one or more items with the at least one destination, the one or more alternate destinations, or a combination thereof based, at least in part, on one or more previous transactions by user at the at least one destination, the one or more alternate destinations, or a combination thereof. The processing platform 109 determines the availability information, the presentation of the at least one message, or a combination thereof based, at least in part, on the association. Further, the one or more previous transactions are conducted using, at least in part, a mobile device payment system, and wherein the mobile device payment system includes, at least in part, a near field communication (NFC) based payment system.

Figure 5:
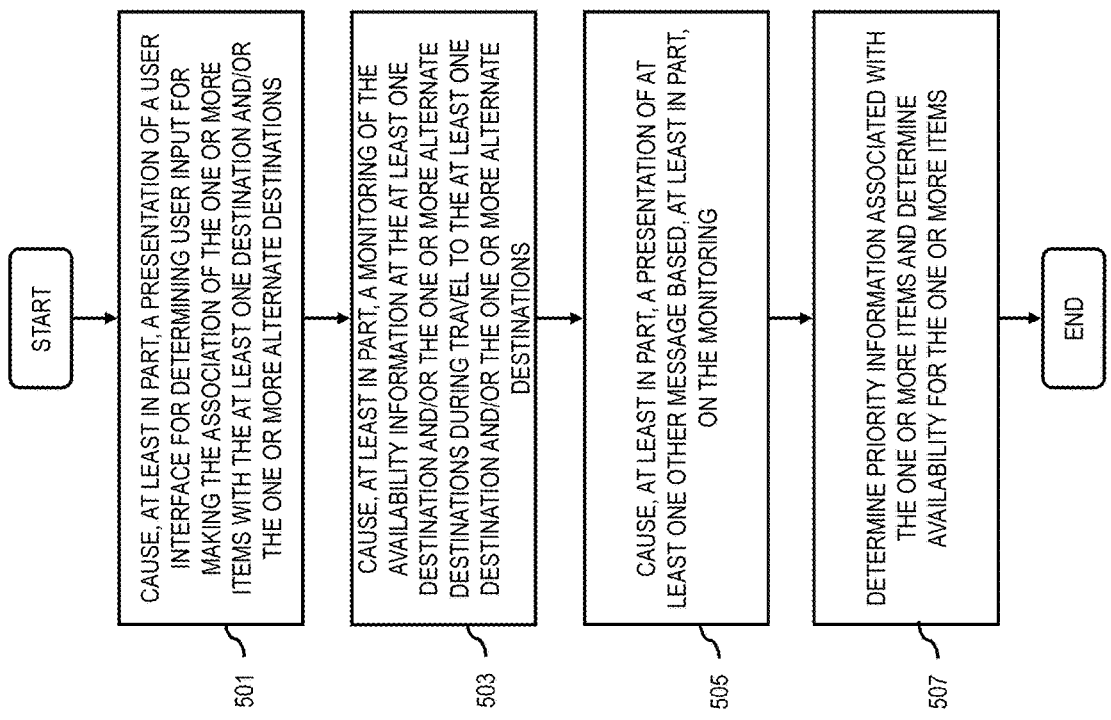

FIG. 5 is a flowchart of a process for causing a presentation of a user interface for determining user input and monitoring the availability information, according to one embodiment. In one embodiment, the processing platform 109 performs the process 500 and is implemented in, for instance, a chip set including a processor and a memory as shown in FIG. 12.

In step 501, the processing platform 109 causes, at least in part, a presentation of a user interface for determining user input for making the association of the one or more items with the at least one destination, the one or more alternate destinations, or a combination thereof. In one scenario, the processing platform 109 may prompt a user to correlate one or more items the user purchases using a mobile device payment system with one or more POIs. The processing platform 109 may display a user interface, for instance, 'save these purchased product to these POIs?' to determine user input, whereby user assigns the items of user's interest to the destination of user's interest.

In step 503, the processing platform 109 causes, at least in part, a monitoring of the availability information at the at least one destination, the one or more alternate destinations, or a combination thereof during travel to the at least one destination, the one or more alternate destinations, or a combination thereof.

In step 505, the processing platform 109 causes, at least in part, a presentation of at least one other message based, at least in part, on the monitoring. In one scenario, the processing platform 109 may monitor the availability for the one or more items, continuously, periodically, according to a schedule, on demand, or a combination thereof. Further, the processing platform 109 may cause an update of the one or more lists, based, at least in part, on the monitoring. Subsequently, the processing platform 109 may present the one or more lists to the users.

In step 507, the processing platform 109 determines priority information associated with the one or more items, wherein the priority information includes, at least in part, a required item classification. The processing platform 109 may further determine the availability for the one or more items in the required item classification. In one scenario, the processing platform 109 may process the contextual information of one or more users to determine their preference information in relation to the items of interest. In one scenario, a user may have 10 items in his 'must have' list, but there can be preference amongst the items in the list. Therefore, the processing platform 109 may process the contextual information of the one or more users to determine the preference of the items within the required item classification and may recommend destinations based on such determinations.

Figure 6:
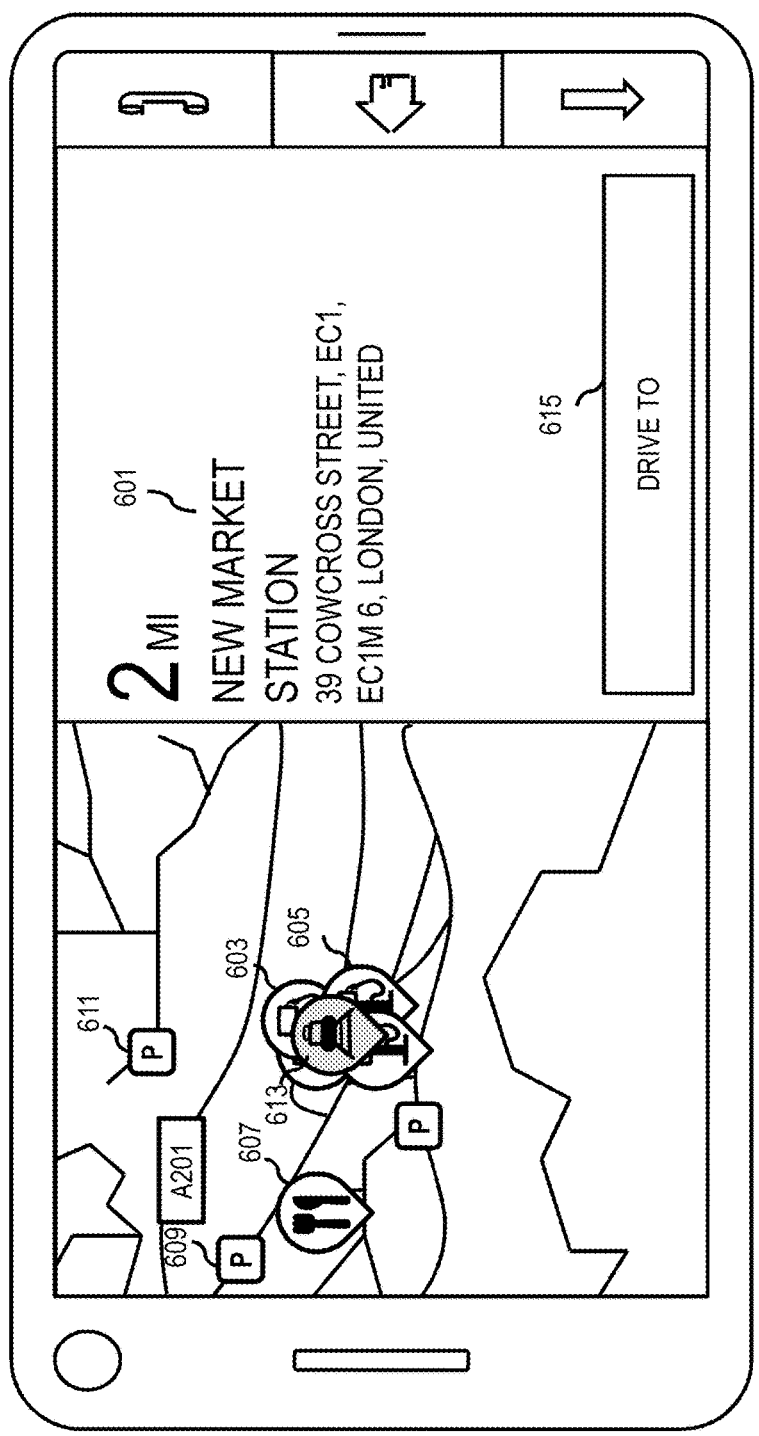
FIGS. 6-9 are diagrams of user interfaces utilized in the processes of FIGS. 3-5, according to various embodiments.

FIG. 6 is a diagram of user interface utilized in the process of FIGS. 3-5, according to one embodiment. FIG. 6 presents an example of the proposed solution in a navigation system by allowing users to automatically check for products availability before initiating route calculation for a destination. In one scenario, a user may want to visit the new market station (601) to purchase certain products, a user may choose to walk or drive or take public means of transportation to the destination depending on the distance of the destination, the user may enter the destination information for navigation purposes, whereby the UE 101 may display several point of interests (603, 605, 607, 609, 611) around the destination (613). Further, the UE 101 may display a 'drive to' button (615) for the user to initiate route calculation to the new market station. In one scenario, a user may have one or more destinations in mind that needs to be visited, regardless of possible items of interest at or near such destinations. In alternate embodiments, the processing platform 109 may provide for options to select the one or more destinations the user denotes as 'must visit'. The processing platform 109 may then suggest, based on a combination of the 'must visit' destination and the 'must have' items, the one or more destinations. In one scenario, the processing platform 109 may provide for 'blacklisting' a destination, whereby the processing platform 109 may take into consideration contextual user information, for instance, a user may always want to stay away from some destinations, therefore these destinations should not be suggested to the user, even if the items of interest are available in these destinations. On the other hand, the processing platform 109 may provide for an overriding effect, whereby user settings/preferences could be provided for to override the blacklisting effect, for instance, if the blacklisted destinations are the only places where an item is available. In one scenario, the processing platform 109 may set certain item categories to temporarily override the blacklist settings, for instance, a user may temporarily disable a blacklisted setting for a destination, in case the cost difference for an item of interest is more than 35% higher in the destination of interest than in the blacklisted destination.

Figure 7:
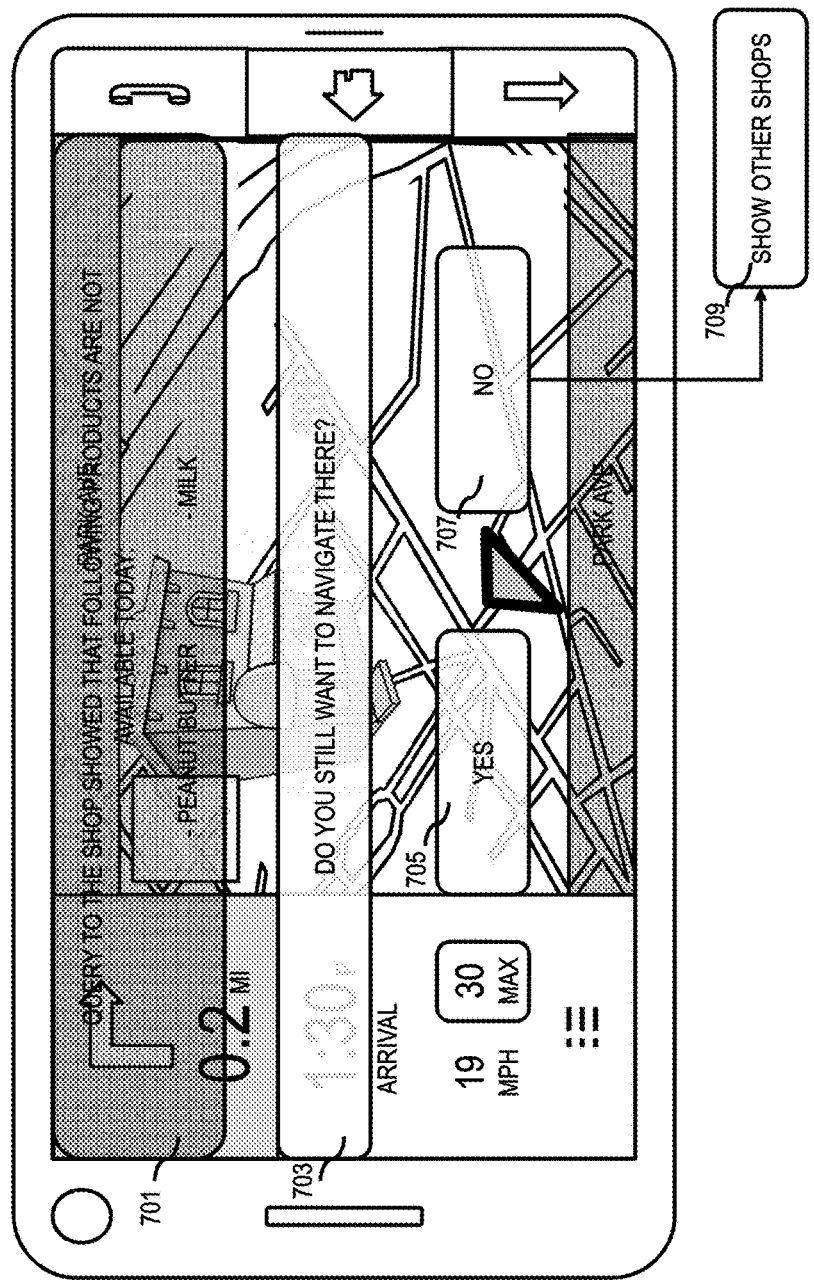

FIG. 7 is a diagram of user interface utilized in the process of FIGS. 3-5, according to one embodiment. In one scenario, the user may press the 'drive to' button (615) for route calculation to the new market station (601), the route calculation activates the online query to the server associated with the new market station asking for specific products availability. In one scenario, the processing platform 109 determines products which the users may require, such determination may be based on manual entry by the user and/or processing of contextual information of a user, such as, recurrent online purchases by the users, payments made for the purchases by user's UE 101 etc. In one scenario, a user may assign products to certain destinations when he purchases them using his UE 101. During the purchase transaction the user may be prompted to save a product for certain POI. By saving the product the user enables easy query of this product. In this scenario, the processing platform 109 determines that the user is interested in purchasing peanut butter and milk, thereby the processing platform 109 queries the new market station's storage repositories regarding the availability of peanut butter and milk. The processing platform 109 causes a presentation of an alert message based, at least in part, on non-availability of one or more products at a specific point of interest (701). Further, the processing platform 109 may display a prompt message, wherein the at least one prompt to the user with respect to availability of the products includes, at least in part, one or more questions. The processing platform 109 causes, at least in part, a presentation of one or more other point of interest based, at least in part, on one or more responses from the user to the one or more questions. In one scenario, the processing platform 109 may ask the user if he/she wants to continue with the route calculation for the specified destination (703). The UE 101 may display the route to the new market station (601) if the user indicates that he/she still wants to go by pressing 'Yes' (705), whereas if the user selects "No" (707), the processing platform 109 navigates the user to other alternative destinations (709) with better products availability.

Figure 8:
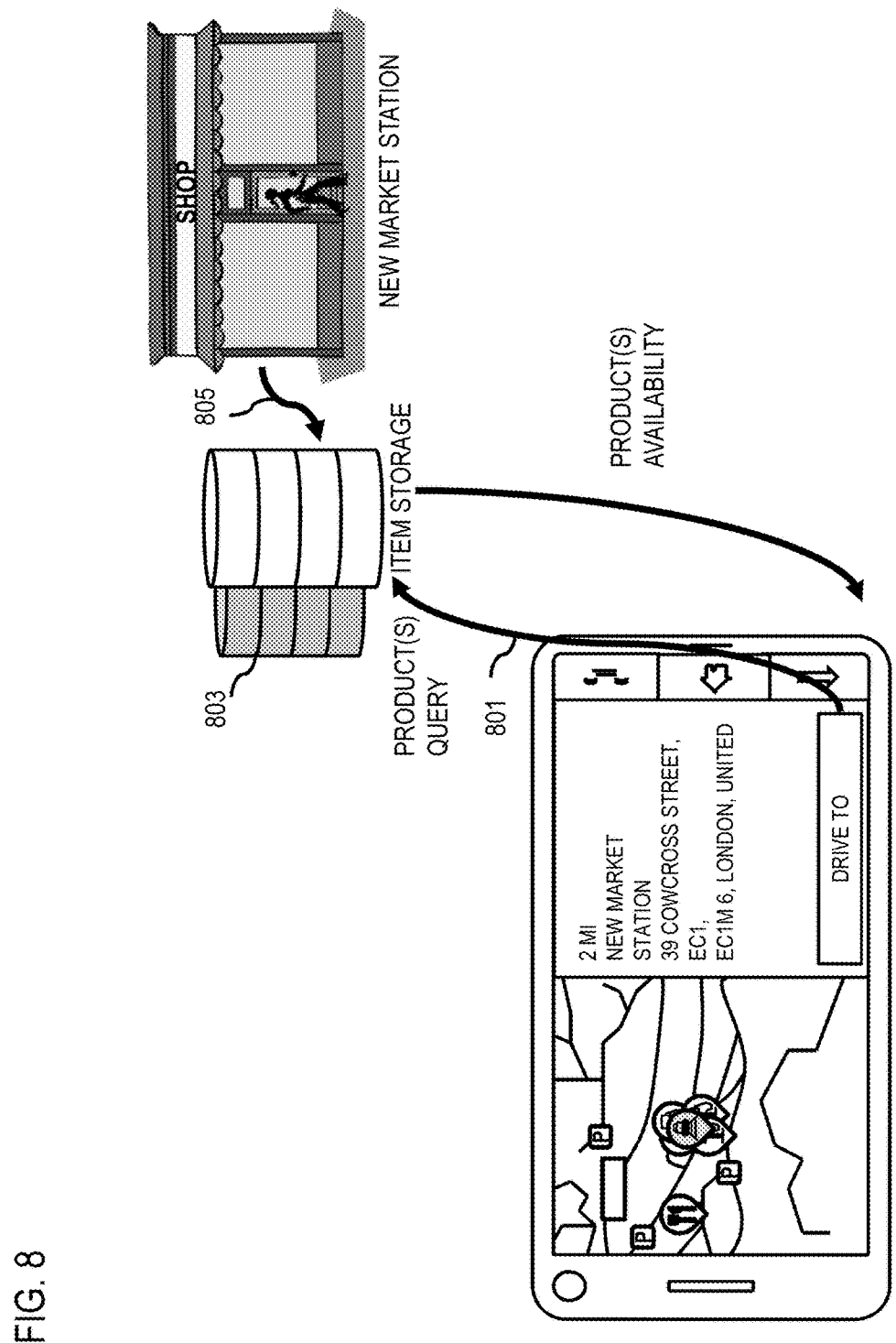

FIG. 8 is a diagram of user interface utilized in the process of FIGS. 3-5, according to one embodiment. FIG. 8 presents an example whereby route calculation activates queries to the server associated with the destination for products availability. As mentioned before, if a user wants to visit the new market station to purchase peanut butter and milk, the processing platform 109 queries storage repositories associated with the new market station for product availability (801). In one scenario, the processing platform 109 causes, at least in part, a comparison of the information provided by the user against information stored in one or more storage repositories associated with the at least one point of interest, wherein the presentation of information on availability of the one or more products is based, at least in part, on the comparison. In one scenario, the items storage (803) may store item information provided by the at least one destination whereby the user intends to purchase the item (805). In one scenario, the processing platform 109 may cause, at least in part, a monitoring of availability of one or more products, continuously, periodically, according to a schedule, on demand, or a combination thereof. The processing platform 109 ensures that the items storage is up-to-date. Subsequently, the processing platform 109 may cause, at least in part, an update of status information for one or more products, based, at least in part, on the monitoring.

Figure 9:
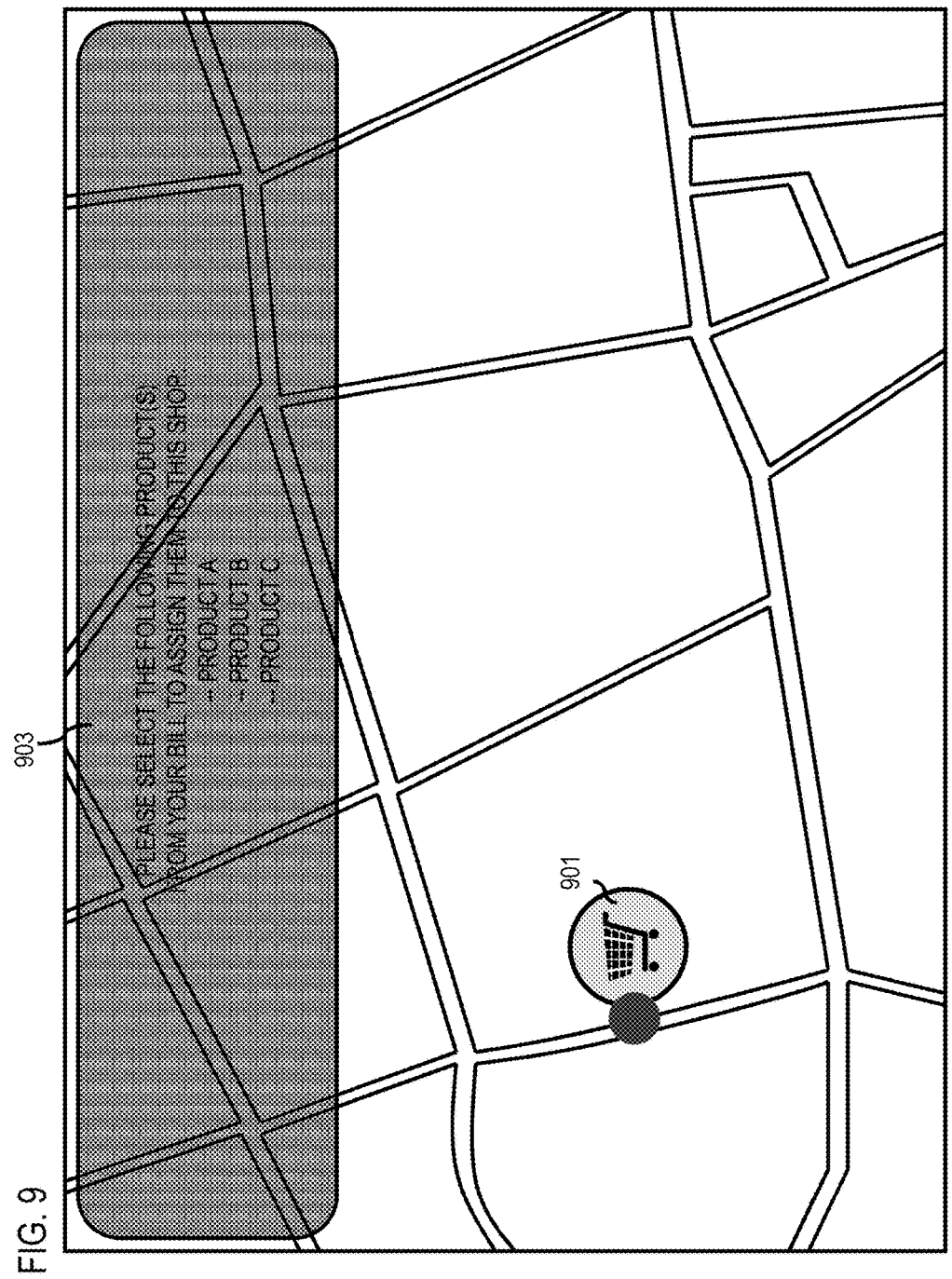

FIG. 9 is a diagram of user interface utilized in the process of FIGS. 3-5, according to one embodiment. In one scenario, a user may activate automatic checking for products availability before initiating route calculation for a destination by assigning products to point of interests when he purchases them using his UE 101. For instance, if a user purchases some regional cake in a shop with his UE 101, he may be prompted on his UE 101 with a message 'Save this product for this POI?'. The user by associating the product with the at least one POI, enables easy query of this product's availability when he/she selects this POI on the map next time. In one scenario, a user purchases Product A, B and C by using his UE 101 from a POI (901), whereby the user may be prompted (903) if he/she wishes to associate the products from the purchase transaction to the POI (901).

Figure 10:
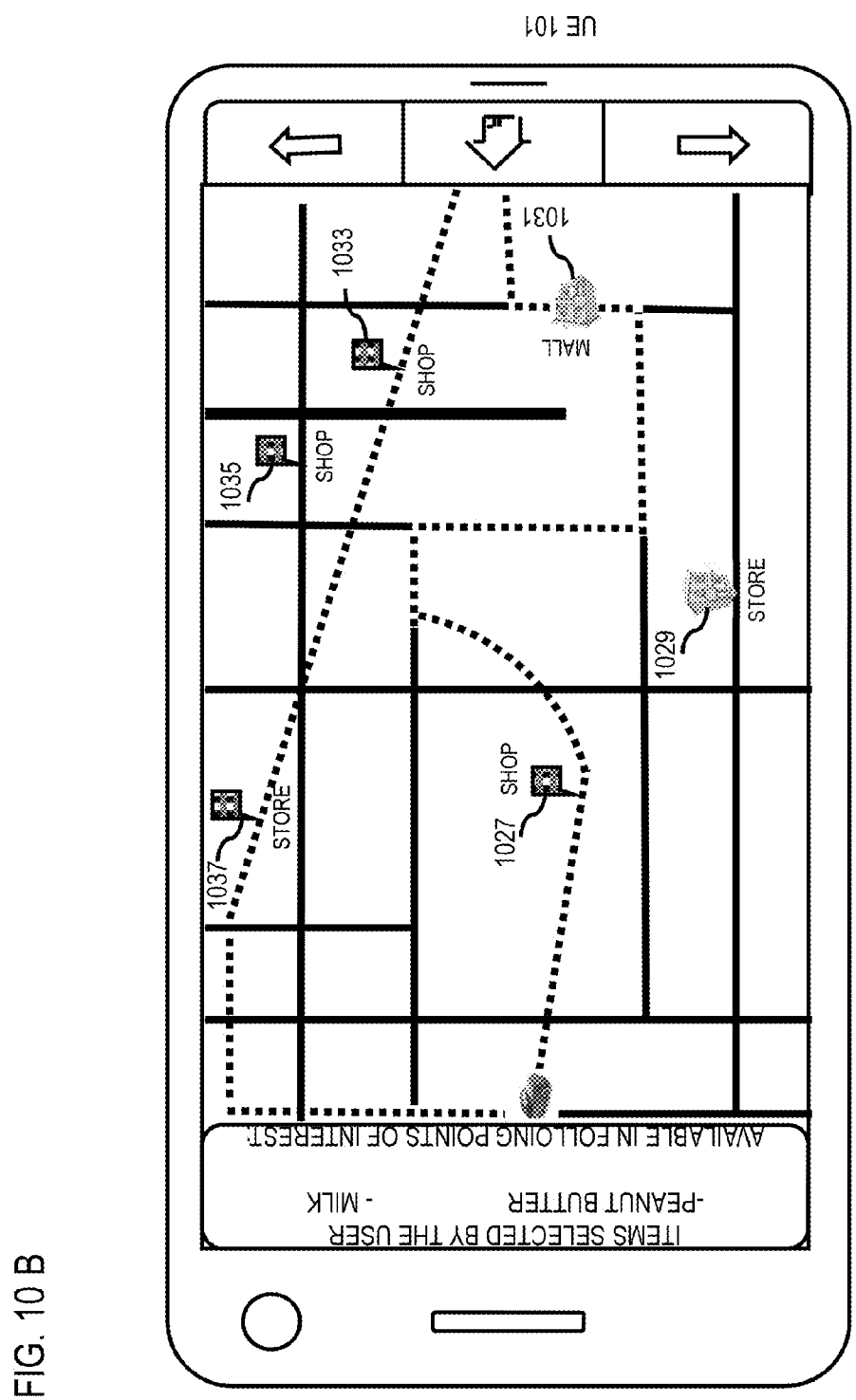
FIG. 10A is a diagram of a list of destinations based on product availabilities and other attributes utilized in the processes of FIGS. 3-5, according to one embodiment.
FIG. 10B is a diagram of user interface utilized in the processes of FIGS. 3-5, according to one embodiment.

FIG. 10A is a diagram of a list of destinations based on product availabilities and other attributes utilized in the processes of FIGS. 3-5, according to one embodiment. In one scenario, the processing platform 109 causes, at least in part, a ranking of one or more point of interest (1003) based, at least in part, on the availability of one or more products (1005), location proximity (1007), estimated time of arrival (1009), the ratio of items available (1011) or a combination thereof. In one scenario, the processing platform 109 may know a user's list of 'must have' items (1001), the processing platform 109 may then suggest the user with one or more destinations based, at least in part, on products availability. For instance, if there are 10 items on a user's 'must have' list (1001), the proposed routes would consider this input in the routing algorithm, together with other attributes. In FIG. 10, the processing platform 109 determines that Shop A (1013) is the most favored destination for the user because it has 9 out of the 10 products from the users "must have" list (1015), is the closest destination from the user's location (1017), has the fastest estimated time of arrival from the user's location to Shop A (1019) and has the highest ratio in relation to the items available from the user's must have list (1021). The other alternative locations, such as Shop B (1011) and Shop C (1013) are provided in the list, ensuring that users have the option to choose from the list.

FIG. 10B is a diagram of user interface utilized in the process of FIGS. 3-5, according to one embodiment. FIG. 10B uses items of interest as destinations, whereby the processing platform 109 may treat the items of interest as possible navigation objects and based on possible existing associations, and the determined availability information, the processing platform 109 creates an appropriate route recommendation and/or suggest POI destination for the users to choose from. In one scenario, there may be two items of interest (peanut butter and milk) for a user, based on the items of interest the UE 101 may cause a presentation of user selectable destinations (1027, 1029, 1031, 1033, 1035 and 1037) which the user may select as per his/her convenience, preference or based on other attributes. In one scenario, the user may choose shop (1027) because the shop is located nearby his present location. On the other hand, user may decide to choose store (1029) because the store is offering discount on the user's items of interest (peanut butter and milk).

The processes described herein for determining availability information of one or more items of interest associated with the user at the at least one destination during initiation of route calculation may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 11:
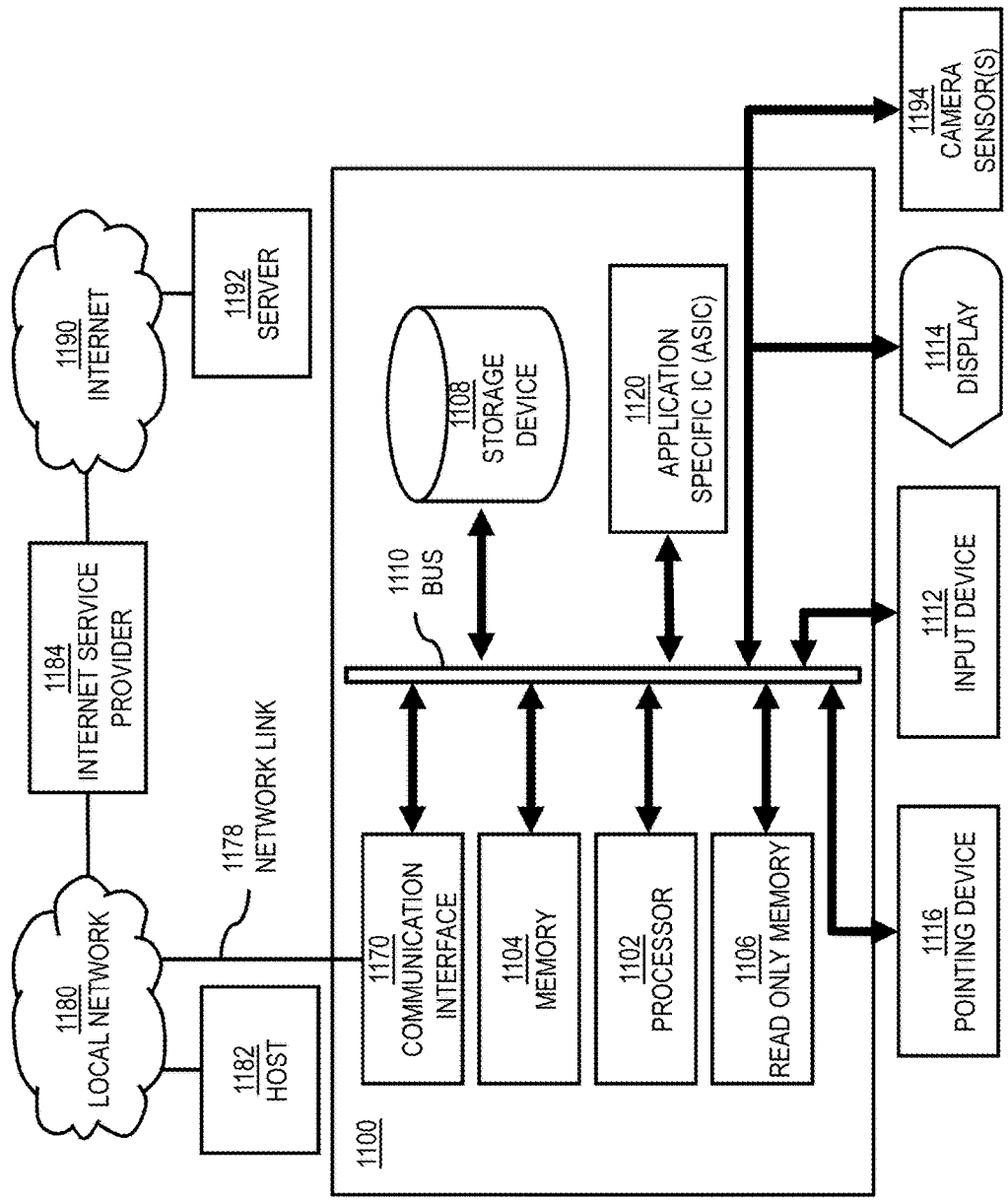
FIG. 11 is a diagram of hardware that can be used to implement an embodiment of the invention.

FIG. 11 illustrates a computer system 1100 upon which an embodiment of the invention may be implemented. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is programmed (e.g., via computer program code or instructions) to determine availability information of one or more items of interest associated with the user at the at least one destination during initiation of route calculation as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of determining availability information of one or more items of interest associated with the user at the at least one destination during initiation of route calculation.

A bus 1110 includes one or more parallel conductors of information so that information is transferred quickly among devices coupled to the bus 1110. One or more processors 1102 for processing information are coupled with the bus 1110.

A processor (or multiple processors) 1102 performs a set of operations on information as specified by computer program code related to determining availability information of one or more items of interest associated with the user at the at least one destination during initiation of route calculation. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND.

Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1100 also includes a memory 1104 coupled to bus 1110. The memory 1104, such as a random access memory (RAM) or any other dynamic storage device, stores information including processor instructions for determining availability information of one or more items of interest associated with the user at the at least one destination during initiation of route calculation. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or any other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for determining availability information of one or more items of interest associated with the user at the at least one destination during initiation of route calculation, is provided to the bus 1110 for use by the processor from an external input device 1112, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT), a liquid crystal display (LCD), a light emitting diode (LED) display, an organic LED (OLED) display, a plasma screen, or a printer for presenting text or images, and a pointing device 1116, such as a mouse, a trackball, cursor direction keys, or a motion sensor, for controlling a position of a small cursor image presented on the display 1114 and issuing commands associated with graphical elements presented on the display 1114, and one or more camera sensors 1194 for capturing, recording and causing to store one or more still and/or moving images (e.g., videos, movies, etc.) which also may comprise audio recordings. In some embodiments, for example, in embodiments in which the computer system 1100 performs all functions automatically without human input, one or more of external input device 1112, display device 1114 and pointing device 1116 may be omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of ASICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 107 for determining availability information of one or more items of interest associated with the user at the at least one destination during initiation of route calculation to the UE 101.

The term "computer-readable medium" as used herein refers to any medium that participates in providing information to processor 1102, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1108. Volatile media include, for example, dynamic memory 1104. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system 1100 can be deployed in various configurations within other computer systems, e.g., host 1182 and server 1192.

At least some embodiments of the invention are related to the use of computer system 1100 for implementing some or all of the techniques described herein. According to one embodiment of the invention, those techniques are performed by computer system 1100 in response to processor 1102 executing one or more sequences of one or more processor instructions contained in memory 1104. Such instructions, also called computer instructions, software and program code, may be read into memory 1104 from another computer-readable medium such as storage device 1108 or network link 1178. Execution of the sequences of instructions contained in memory 1104 causes processor 1102 to perform one or more of the method steps described herein. In alternative embodiments, hardware, such as ASIC 1120, may be used in place of or in combination with software to implement the invention. Thus, embodiments of the invention are not limited to any specific combination of hardware and software, unless otherwise explicitly stated herein.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server host 1192 transmits program code for a particular application, requested by a message sent from computer 1100, through Internet 1190, ISP equipment 1184, local network 1180 and communications interface 1170. The received code may be executed by processor 1102 as it is received, or may be stored in memory 1104 or in storage device 1108 or any other non-volatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

FIG. 12 illustrates a chip set or chip 1200 upon which an embodiment of the invention may be implemented. Chip set 1200 is programmed to determining availability information of one or more items of interest associated with the user at the at least one destination during initiation of route calculation as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1200 can be implemented in a single chip. It is further contemplated that in certain embodiments the chip set or chip 1200 can be implemented as a single "system on a chip." It is further contemplated that in certain embodiments a separate ASIC would not be used, for example, and that all relevant functions as disclosed herein would be performed by a processor or processors. Chip set or chip 1200, or a portion thereof, constitutes a means for performing one or more steps of providing user interface navigation information associated with the availability of functions. Chip set or chip 1200, or a portion thereof, constitutes a means for performing one or more steps of determining availability information of one or more items of interest associated with the user at the at least one destination during initiation of route calculation.

In one embodiment, the chip set or chip 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1200 includes merely one or more processors and some software and/or firmware supporting and/or relating to and/or for the one or more processors.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to determining availability information of one or more items of interest associated with the user at the at least one destination during initiation of route calculation. The memory 1205 also stores the data associated with or generated by the execution of the inventive steps.

Figure 13:
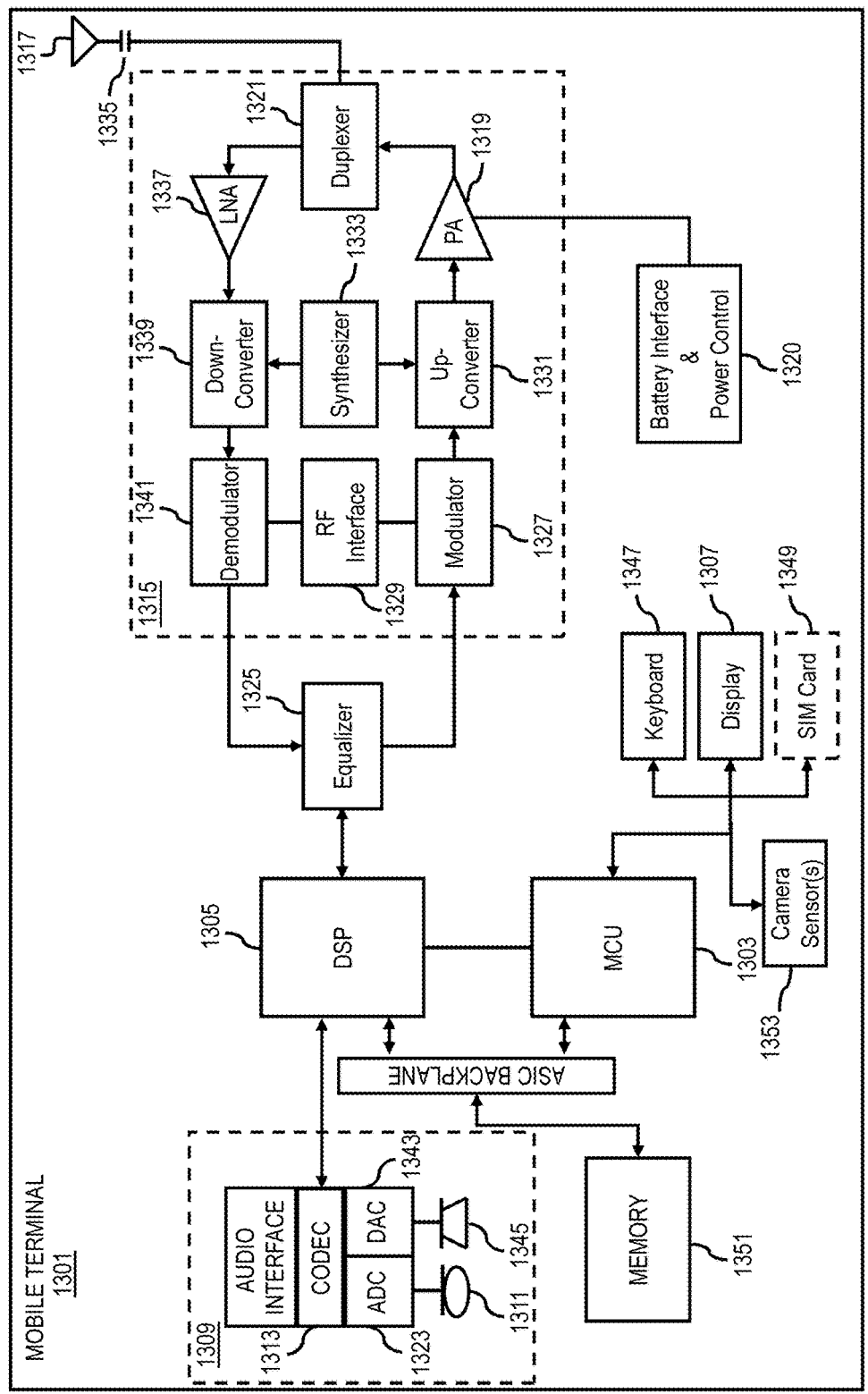
FIG. 13 is a diagram of a mobile terminal (e.g., handset) that can be used to implement an embodiment of the invention.

FIG. 13 is a diagram of exemplary components of a mobile terminal (e.g., handset) for communications, which is capable of operating in the system of FIG. 1, according to one embodiment. In some embodiments, mobile terminal 1301, or a portion thereof, constitutes a means for performing one or more steps of determining availability information of one or more items of interest associated with the user at the at least one destination during initiation of route calculation. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps of determining availability information of one or more items of interest associated with the user at the at least one destination during initiation of route calculation. The display 1307 includes display circuitry configured to display at least a portion of a user interface of the mobile terminal (e.g., mobile telephone). Additionally, the display 1307 and display circuitry are configured to facilitate user control of at least some functions of the mobile terminal. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303 which can be implemented as a Central Processing Unit (CPU).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 to determine availability information of one or more items of interest associated with the user at the at least one destination during initiation of route calculation. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network. The card 1349 also contains a memory for storing a personal telephone number registry, text messages, and user specific mobile terminal settings.

Further, one or more camera sensors 1353 may be incorporated onto the mobile station 1301 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    receiving a request from a user to initiate a navigable route calculation, wherein the request specifies one or more items of interest as a target destination of the navigable route calculation;
    determining, responsive to the request to initiate a navigable route calculation, current availability information of the one or more items of interest at at least one geographical destination, at least one alternate geographical recommendation, or a combination thereof, prior to initiating the navigable route calculation;
    determining current availability information of the one or more items of interest at at least one geographical destination, at least one alternate geographical recommendation, or a combination thereof prior to initiating the navigable route calculation, wherein the current availability information indicates whether the one or more items are available to the user at the at least one geographical destination, the at least one alternate destination, or a combination thereof;
    generating at least one recommendation of the at least one geographical destination, the at least one alternate geographical destination, or a combination thereof as the target destination for the navigable route calculation based, at least in part, on the current availability information; and
    presenting at least one message to the user regarding the current availability information, the at least one recommendation, or a combination thereof.

2. A method of claim 1, further comprising:
    receiving an input from the user that selects the target destination from among the at least one geographical destination, the at least one alternate geographical destination, or a combination thereof; and
    initiating the navigable route calculation to the selected target destination.

3. A method of claim 1, further comprising:
    determining the at least one alternate geographical destination based, at least in part, on at least one algorithm that considers an item availability parameter in combination with a distance parameter, an estimated time of arrival parameter, or a combination thereof.

4. A method of claim 1, further comprising:
    presenting the current availability information respectively for the at least one geographical destination and the at least one alternate geographical destination.

5. A method of claim 4, wherein the presentation of the current availability information is via a route selection user interface of a navigation application, a mapping application, or a combination thereof.

6. A method of claim 1, further comprising:
    associating the one or more items with the at least one geographical destination, the at least one alternate geographical destination, or a combination thereof based, at least in part, on one or more previous transactions by the user at the at least one geographical destination, the at least one alternate geographical destination, or a combination thereof,
    wherein the determination of the current availability information, the presentation of the at least one message, or a combination thereof is based, at least in part, on the association.

7. A method of claim 6, wherein the one or more previous transactions are conducted using, at least in part, a mobile device payment system, and wherein the mobile device payment system includes, at least in part, a near field communication (NFC) based payment system.

8. A method of claim 6, further comprising:
    presenting a user interface for determining user input for making the association of the one or more items with the at least one geographical destination, the at least one alternate geographical destination, or a combination thereof.

9. A method of claim 1, further comprising:
monitoring the current availability information at the at least one geographical destination, the at least one alternate geographical destination, or a combination thereof during travel to the at least one geographical destination, the at least one alternate geographical destination, or a combination thereof; and
presenting at least one other message based, at least in part, on the monitoring.

10. A method of claim 1, further comprising:
determining priority information associated with the one or more items, wherein the priority information includes, at least in part, a required item classification; and
determining the current availability information based on the one or more items in the required item classification.

11. An apparatus comprising:
at least one processor; and
at least one memory including computer program code for one or more programs,
the at least one memory and the computer program code configured to, with the at least one processor, cause the apparatus to perform at least the following,
receive a request from a user to initiate a navigable route calculation, wherein the request specifies one or more items of interest as a target destination of the navigable route calculation;
determine current availability information of the one or more items of interest at at least one geographical destination, at least one alternate geographical recommendation, or a combination thereof prior to initiating the navigable route calculation, wherein the current availability information indicates whether the one or more items are available to the user at the at least one geographical destination, the at least one alternate destination, or a combination thereof;
determine, responsive to the request to initiate a navigable route calculation, current availability information of the one or more items of interest at at least one geographical destination, at least one alternate geographical recommendation, or a combination thereof, prior to initiating the navigable route calculation;
generate at least one recommendation of that at least one geographical destination, the at least one alternate geographical destination, or a combination thereof as the target destination for the navigable route calculation based, at least in part, on the current availability information; and
present at least one message to the user regarding the current availability information, the at least one recommendation, or a combination thereof.

12. An apparatus of claim 11, wherein the apparatus is further caused to:
receive an input from the user that selects the target destination from among the at least one geographical destination, the at least one alternate geographical destination, or a combination thereof; and
initiate the navigable route calculation to the selected target destination.

13. An apparatus of claim 11, wherein the apparatus is further caused to:
determine the at least one alternate geographical destination based, at least in part, on at least one algorithm that considers an item availability parameter in combination with a distance parameter, an estimated time of arrival parameter, or a combination thereof.

14. An apparatus of claim 11, wherein the apparatus is further caused to:
present the current availability information respectively for the at least one geographical destination and the at least one alternate geographical destination.

15. An apparatus of claim 14, wherein the presentation of the current availability information is via a route selection user interface of a navigation application, a mapping application, or a combination thereof.

16. An apparatus of claim 11, wherein the apparatus is further caused to:
associate the one or more items with the at least one geographical destination, the at least one alternate geographical destination, or a combination thereof based, at least in part, on one or more previous transactions by user at the at least one geographical destination, the at least one alternate geographical destination, or a combination thereof,
wherein the determination of the current availability information, the presentation of the at least one message, or a combination thereof is based, at least in part, on the association.

17. An apparatus of claim 16, wherein the one or more previous transactions are conducted using, at least in part, a mobile device payment system, and wherein the mobile device payment system includes, at least in part, a near field communication (NFC) based payment system.

18. An apparatus of claim 16, wherein the apparatus is further caused to:
present a user interface for determining user input for making the association of the one or more items with the at least one geographical destination, the at least one alternate geographical destination, or a combination thereof.

19. An apparatus of claim 11, wherein the apparatus is further caused to:
monitor the availability information at the at least one geographical destination, the at least one alternate geographical destination, or a combination thereof during travel to the at least one geographical destination, the at least one alternate geographical destination, or a combination thereof; and
present at least one other message based, at least in part, on the monitoring.

20. An apparatus of claim 11, wherein the apparatus is further caused to:
determine priority information associated with the one or more items, wherein the priority information includes, at least in part, a required item classification; and
determine the current availability information based on the one or more items in the required item classification.

* * * * *